United States Patent [19]

Fargo

[11] Patent Number: 4,624,282
[45] Date of Patent: Nov. 25, 1986

[54] TWO-STAGE SOLENOID VALVE

[75] Inventor: Richard N. Fargo, Newington, Conn.

[73] Assignee: Honeywell Inc., Minneapolis, Minn.

[21] Appl. No.: 697,599

[22] Filed: Feb. 1, 1985

[51] Int. Cl.$^4$ ............................................. F16K 31/06
[52] U.S. Cl. ............................. 137/599.2; 251/129.1; 251/129.21
[58] Field of Search ................ 137/599.2, 614.17, 630; 251/139, 137, 141, 129.1, 129.21

[56] References Cited

U.S. PATENT DOCUMENTS

| | | | |
|---|---|---|---|
| 1,882,392 | 10/1932 | Musgrave | 251/137 X |
| 3,100,103 | 8/1963 | Bullard | 251/141 X |
| 3,149,644 | 9/1964 | Bosack | 251/137 X |
| 3,771,562 | 11/1973 | Curran | . |
| 4,102,526 | 7/1978 | Hargraves | 251/139 |
| 4,342,443 | 8/1982 | Wakeman | 251/137 |
| 4,403,765 | 9/1983 | Fisher | 251/139 X |

FOREIGN PATENT DOCUMENTS 1115243  4/1956  France ........................... 137/614.17

Primary Examiner—Martin P. Schwadron
Assistant Examiner—Stephen M. Hepperle
Attorney, Agent, or Firm—Mitchell J. Halista; Trevor B. Joike

[57] ABSTRACT

A two-stage solenoid valve uses a pair of stacked coaxial armatures in a cylindrical sleeve housing. A first armature is provided with a fluid sealing ring and is urged by a first spring to peripherally seal an adjacent internal fluid port in a valve base supporting a first end of the sleeve housing. The first armature is provided with a coaxial bore extending through the armature and coaxial with the fluid sealing ring to form a fluid channel. The second armature also has a coaxial bore extending therethrough with a resilient sealing member slideably retained within the bore. A second spring is arranged to urge the resilient sealing member against a first end of the bore in the second armature and to extend therefrom to a fixed plug in a second end of the cylindrical housing. The resilient sealing member cooperates with a fluid port defining an end of the coaxial bore in the first armature opposite the end of the first armature having the fluid sealing surface. A first and a second solenoid coil are coaxially stacked to surround the cylindrical sleeve housing adjacent to respective ones of the first and second armatures. An energization of the second coil provides a first fluid path through the bore in the first armature while an energization of both coils provides a second fluid path directly through the fluid port in the valve base to provide a first and a second flow rate, respectively, through the valve.

11 Claims, 4 Drawing Figures

TWO-STAGE SOLENOID VALVE

BACKGROUND OF THE INVENTION

1. Field of the Invention

The present invention is directed to a solenoid operated valve. More specifically, the present invention is directed to a two-stage solenoid valve for selectively providing a first and a second flow rate therethrough.

2. Description of the Prior Art

Prior attempts to provide two different flow rates have included the use of two valves in parallel flow lines with a selective actuation of the valves that have been provided with different size flow control orifices. Another prior art solution to the problem used a single orifice valve with a single coil and armature and a half-wave rectified alternating current (AC) input energizing signal. The energizing signal produced an oscillation of the armature at a fixed frequency to produce a reduced flow rate relative to a non-oscillatory fully opened position of the armature produced by a non-rectified energizing signal. Another prior art approach utilized a first and a second solenoid coil to respectively position a first and a second coaxial armature acting jointly on a single orifice sealing means to position the sealing means at a first and a second spaced position with respect to the orifice. These prior art approaches have inherent disadvantages such as chatter at reduced flow in the case of the oscillating armature, increased cost of the extra valve and plumbing in the case of the dual valve and inability to maintain a precise ratio between the two flow rates in the case of the valve using the dual armatures and single sealing means valve. Accordingly, in order to overcome the aforesaid shortcomings of the prior art, it is desireable to provide a valve having a selectively variable flow rate while exhibiting a quiet operation and precise selection of a flow rate to maintain a fixed ratio therebetween.

SUMMARY OF THE INVENTION

An object of the present invention is to provide an improved solenoid valve for selectively providing a first and second flow rate therethrough.

In accomplishing this and other objects, there has been provided, in accordance with the present invention a two-stage solenoid valve having a fluid orifice defining a first fluid channel, a first sealing means having a second fluid channel extending therethrough and coaxially aligned with said first fluid channel, a first armature means attached to said sealing means and having a third fluid channel extending therethrough and coaxially aligned with said second fluid channel in said sealing means, a first solenoid coil means for selectively positioning said first armature means to provide a spacing of said first sealing means from said fluid orifice, a second armature means, a second sealing means confined by said second armature means and aligned with an end of said third fluid channel through said first armature, a second solenoid coil means for selectively positioning said second armature to provide a spacing of the second sealing means from said end of said third fluid channel.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
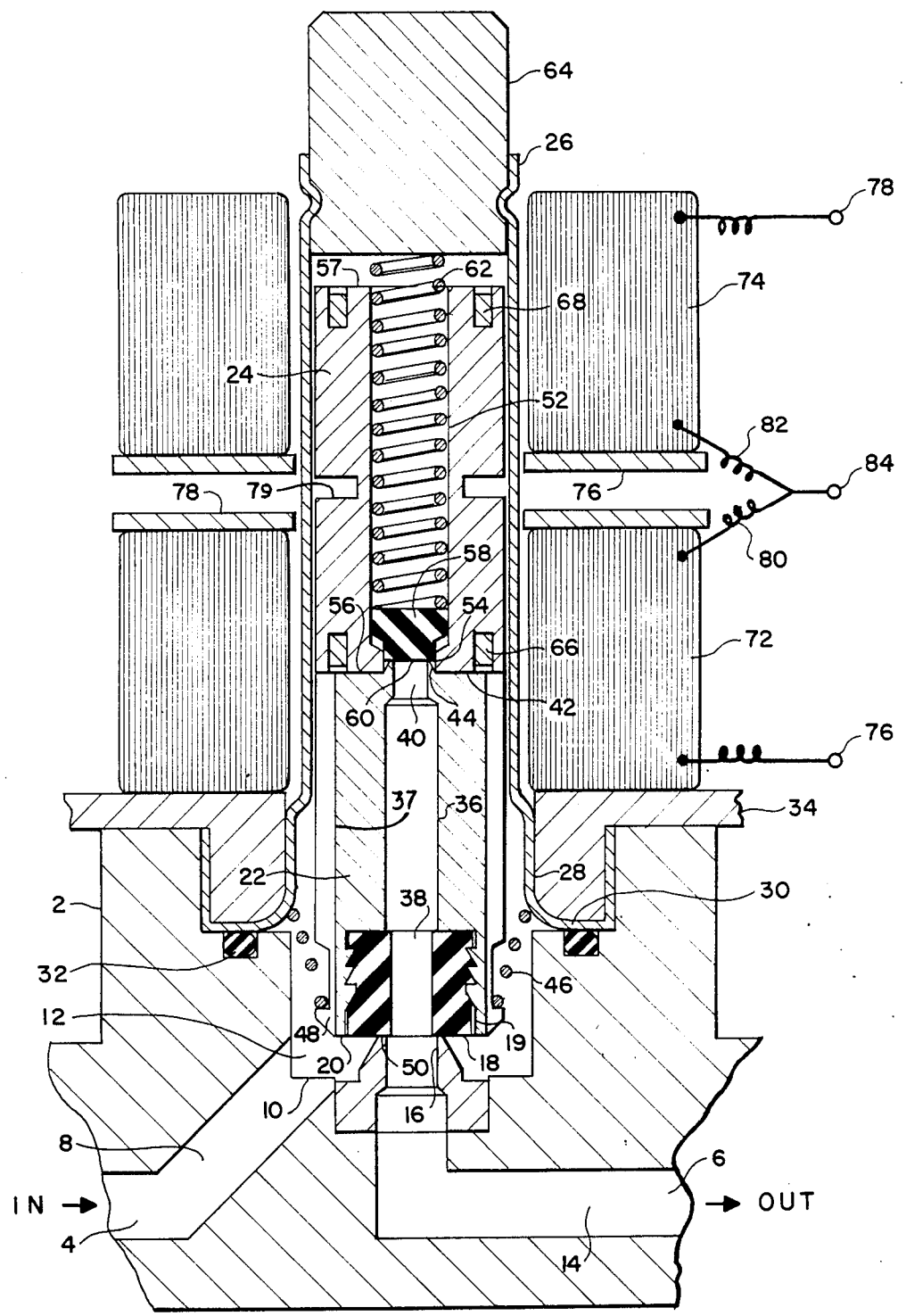
FIG. 1 is a cross-sectional illustration of a two-stage solenoid valve embodying an example of the present invention and FIGS. 2A, 2B and 2C are simplified cross-sectional illustrations of the valve shown in FIG. 1 and illustrate a sequence of operations thereof.

Referring to FIG. 1 in more detail, there is shown a cross-sectional illustration of a two-stage solenoid valve embodying an example of the present invention and having a valve body 2 with a fluid inlet port 4 and fluid outlet port 6. The fluid inlet port 4 is connected to a fluid inlet passage 8 in the valve body 2 which passage 8 terminates in a first internal fluid port 10 communicating with a cylindrical recess 12 in the valve body 2. Similarly, the fluid outlet port 6 is connected to a fluid passage 14 in the valve body 2 which connects the fluid outlet port to a second internal fluid port 16.

A fluid sealing ring 18 is captured within a coaxial counterbore 19 in a first end face 20 of a first valve armature 22 and is arranged to peripherally seal the port 16 in a closed condition of the valve. The first armature 22 is stacked coaxially with a second armature 24 within a cylindrical sleeve 26. An internal first end 28 of the sleeve 26 is provided with an outwardly extending peripheral flange 30 which may be sealed to the valve body 2 by a suitable fluid sealing means, e.g., an O-ring 32. The flange 30 may be retained against the O-ring 32 by any suitable means, e.g., a valve cover 34 shown partially in FIG. 1, and having a suitable firm connection with the valve body 2.

The first armature 22 is provided with a coaxial bore 36 extending therethrough to provide a fluid channel through the first armature 22 while a plurality of exterior longitudinal grooves 37 provide fluid channels along the outside of the first armature 22 between the recess 12 and the bore 36. Concurrently, the fluid sealing ring 18 is also provided with a coaxial hole 38 aligned with the bore 36 in the first armature 22. The other or second end of the first armature 22 is provided with a fluid metering orifice 40 extending between the bore 36 and a second end face 42 of the first armature. An outwardly projecting peripheral ridge 44 on the second end face 42 surrounds the fluid metering orifice 40 to provide a fluid sealing surface. A first coaxial coil spring 46 is located between the flange 30 and a radially outwardly extending peripheral ledge 48 on the first end face 20 of the first armature 22 to urge the first armature 22 and the first fluid sealing ring 18 against an outwardly extending fluid sealing surface 50 defining an open end of the second internal port 16 to peripherally seal the port 16.

The second armature 24 located within the sleeve 26 is provided with a coaxial bore 52 extending therethrough. An inwardly directed coaxial lip 54 defining an end of the bore 52 in a first end face 56 of the second armature 24 is arranged to confine a slideable resilient sealing plug 58 within the bore 52 of the second armature 24 extending through the opening defined by the coaxial lip 54 toward the fluid metering orifice 40. A second spring 62 is confined within the second armature 24 and is arranged to extend between the resilient plug 58 within the bore 52 in the second armature 24 and a magnetic material end plug 64 which plug 64 is fixedly retained in a second end of the sleeve 26 to seal the second end of the sleeve 26 and to provide a magnetic flux path. A first copper shading ring 66 is provided in the first end face 56 of the second armature 24, and a second copper shading ring 68 is provided in a second end face 70 of the second armature 24.

A first solenoid coil assembly 72 in the form of an annulus surrounding a portion of the sleeve 26 is positioned adjacent to the cover 34. A second solenoid coil assembly 74 is the form of an annulus is spaced from the first coil assembly 72 by a pair of spaced apart magnetic material rings in the form of flat plates 76, 78 and is also arranged to surround a portion of the sleeve 26. The plates 76, 78 function as magnetic flux path directing elements to minimize stray magnetic flux paths between the coil assemblies 72 and 74. The second armature 24 is also provided with a peripheral groove 79 located approximately between the flux plates 76, 78 to further minimize the amount of stray magnetic flux flowing between the second coil 74 and the first armature 22 to minimize any undesired effect therebetween, e.g., the magnetic flux from the second coil 74 attracting the first armature 22. The first and second coil assemblies 72, 74 are shown in simplified form in FIG. 1 and may each include an electromagnetic winding and a magnetic field structure. The first coil 72 is provided with a first electrical connection 76 to one end thereof while the second coil 74 is provided with a first electrical connection 78 to one end thereof. A second electrical connection 80 for the other end of the first coil 72 is connected to a second electrical connection 82 for the other end of the second coil 74 and to a common electrical connection 84 forming a center tap between the first and second coils 72, 74.

The valve illustrated in FIG. 1 is shown in a closed state wherein the sealing ring 18 is positioned against the fluid sealing surface 50 of the orifice 16 by the spring 46 acting through the ledge 48 to seal the fluid path through the valve body 2 between the fluid inlet ports 4 and the fluid outlet port 6. In this position, the first armature 22 is located at the bottom of a sleeve 26 while the second armature 24 is located against the adjacent end of the first armature 22 by the action of the spring 62 acting on the sealing ring 58. Thus, the sealing ring 58 is urged against the ridge 44 on the orifice 40 to seal the fluid path through the bore 36 in the first armature 22.

Figure 2C:
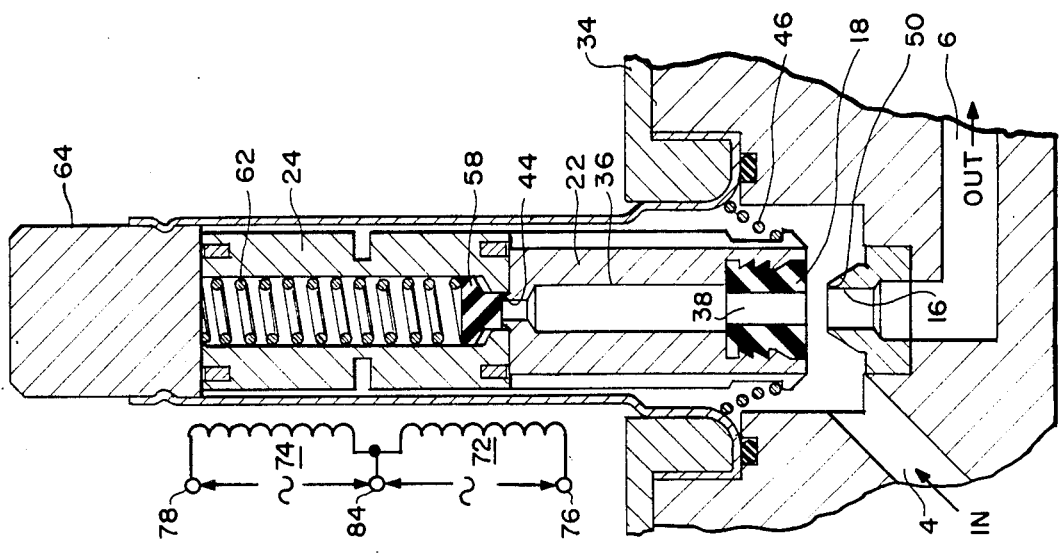
Figure 2B:
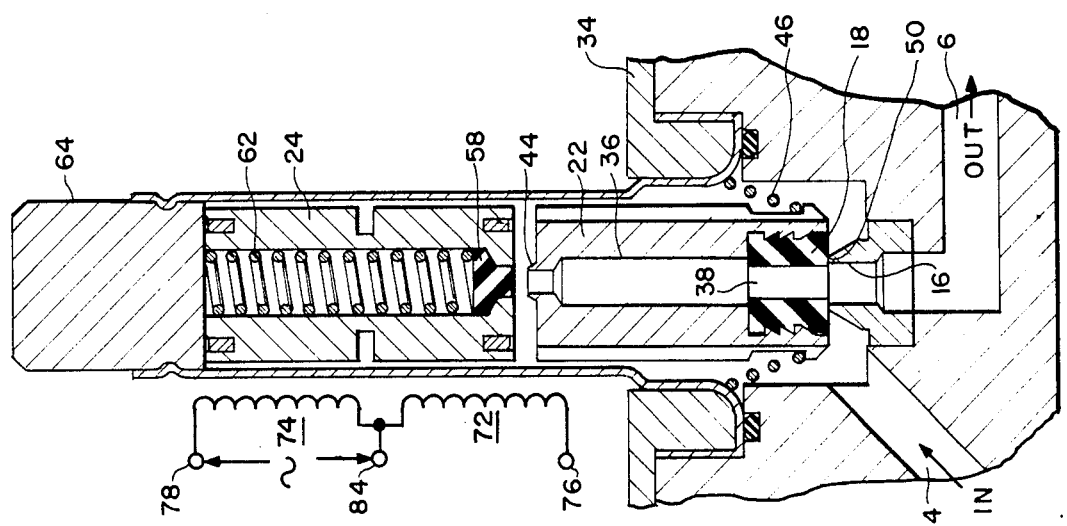
Figure 2A:
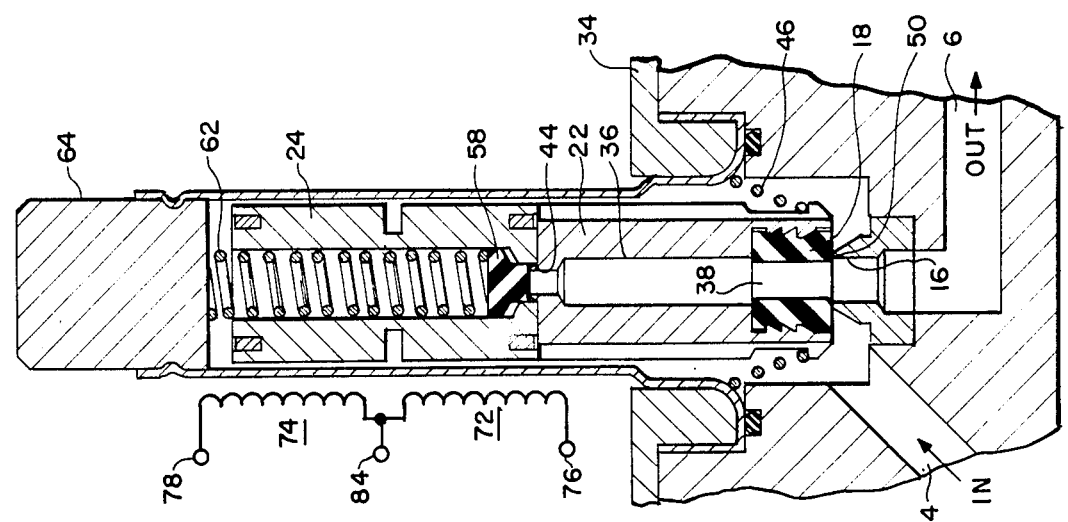

In FIGS. 2A, 2B and 2C, there are shown simplified cross-sectional representations of the valve shown in FIG. 1 to illustrate progressive stages in the operation of the valve to provide a first and second flow rate. FIG. 2A shows the valve in the same closed condition illustrated in FIG. 1. In this state neither of the solenoid coils 72, 74 is energized. FIG. 2B shows a partially opened or first state of the valve to provide a low or first flow rate through the valve body between the inlet port 4 and the outlet port 6. This partially opened state of the valve is achieved by energizing the second solenoid coil 74 from a respective power source, not shown, to effect a positioning of the second armature 24 to the position shown in FIG. 2A. Specifically, the second armature 24 is elevated to a position where the second end face 57 bears against the end plug 64 while compressing the spring 62. In this position of the second armature 24, the plug 58 is separated from the bridge 44 surrounding the orifice 40. Thus, the fluid is now able to flow from the inlet port 4 into the recess 12 and along the grooves 37 on the external surface of the first armature 22 to reach the orifice 40. Subsequently, the fluid flows through the bore 36 in the first armature 22 and the hole 38 in the sealing ring 18 to the orifice 16 and fluid passage 14 to ultimately reach the outlet port 6. This flow is controlled or restricted by the size of the orifice 40 to a predetermined rate which is lower than the maximum flow rate capable of being handled by the valve.

To effect this greater or maximum flow rate through the valve as shown in FIG. 2C, the first and second solenoid coils 72, 74 are energized from a suitable source, not shown. In this operating state of the valve, the second armature is retained in the position described above with respect to the operation illustrated in FIG. 2B and the second armature 24 is now elevated to a position where the second end face 36 is in contact with the first end face 56 of the second armature 24 while the ridge 44 is again in contact with the plug 58 while compressing the spring 46. In this position of the second armature 22, the sealing ring 18 is separated from the fluid sealing surface 50 of the orifice 16 by a maximum distance to achieve a maximum flow rate through the valve.

Accordingly, it may be seen that there has been provided, in accordance with the present invention an improved two-stage solenoid valve for selectively providing a first and second flow rate.

The embodiments of the present invention in which an exclusive property or privilege is claimed are defined as follows:

1. A two-stage solenoid valve comprising
   a fluid orifice defining a first fluid channel,
   a first sealing means having a second fluid channel extending therethrough and coaxially aligned with said first fluid channel,
   a first armature means attached to said sealing means and having a first movable armature with a third fluid channel extending therethrough and coaxially aligned with said second fluid channel in said sealing means,
   a first solenoid coil means for selectively positioning said first armature in said first armature means to provide a spacing of said sealing means from said fluid orifice,
   a second armature means having a second movable armature coaxial with said first armature,
   a second sealing means movably confined by said second armature in said second armature means and aligned with an opposite end of said third fluid channel through said first armature from said first sealing means,
   a second solenoid coil means for selectively positioning said second armature to provide a spacing of said second sealing means from said end of said third fluid channel,
   a housing means for maintaining the coaxial relationship of said first and second armatures while defining a fourth fluid channel between said first armature and an inside surface of said housing means adjacent to said first armature,
   a fixed stop means captured in said housing means,
   a first resilient means located between said housing means and said first armature for urging said first sealing means against said fluid orifice to peripherally seal said fluid orifice and
   second resilient means located between said stop means and said second sealing means for urging said second sealing means against said end of said third fluid channel to seal said end of said third fluid channel and said second armature against said first armature to maintain a first magnetic gap between said second armature and said stop means whereby an energized state of said second coil means is effective to oppose said second resilient means to withdraw said second sealing means from said third fluid channel to produce a first fluid flow state and to eliminate said first gap between the second armature and said stop means while introducing a second magnetic gap between said first and second armatures and a concurrent energization of said first and second solenoid coil means is effective to oppose said first and second resilient means to withdraw said first sealing means from said orifice to produce a second flow state and to eliminate said first gap while maintaining a contact between said armatures and said second sealing means with said third fluid channel.

2. A valve as set forth in claim 1 wherein said first resilient means includes a coil spring coaxial with said first armature means and said second resilient means includes a second coil spring confined said second armature means.

3. A valve as set forth in claim 1 wherein said first sealing means includes a ring of sealing material captured in a first end of said first armature means.

4. A valve as set forth in claim 3 wherein said second sealing means includes a plug of sealing material slideably captured within said second armature means.

5. A valve as set forth in claim 1 wherein said third fluid channel includes a fluid metering orifice.

6. A valve as set forth in claim 2 wherein said second coil spring extends between said stop means and said second sealing means.

7. A valve as set forth in claim 1 wherein said first armature means includes a first movable armature responsive to an energization of said first coil means and said second armature means includes a second movable armature coaxial with said first armature and responsive to an energization of said second coil means.

8. A valve as set forth in claim 7 wherein said first coil means includes a first annular coil assembly and said second coil means includes a second annular coil assembly coaxial with said first coil assembly.

9. A valve as set forth in claim 8 wherein said housing means coaxially aligns said first and second coil assemblies.

10. A valve as set forth in claim 9 wherein said first resilient means includes a first coil spring coaxial with said first armature and extending between said first armature and said housing means.

11. A valve as set forth in claim 10 wherein said second resilient means includes a second coil spring confined by said second armature and extending between said second armature and said stop means.

* * * * *